J. G. FRIBERG.
UNIVERSALLY ADJUSTABLE COMBINED HORSE COLLAR AND HAMES.
APPLICATION FILED AUG. 2, 1909.
987,127.
Patented Mar. 21, 1911.
2 SHEETS—SHEET 1.
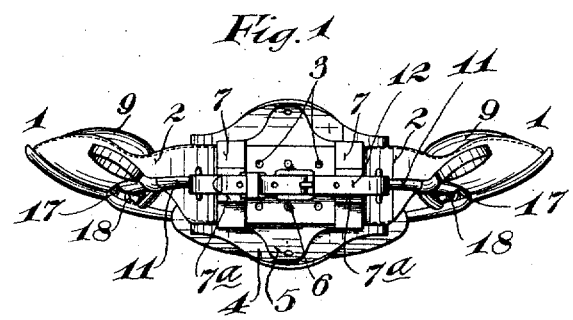
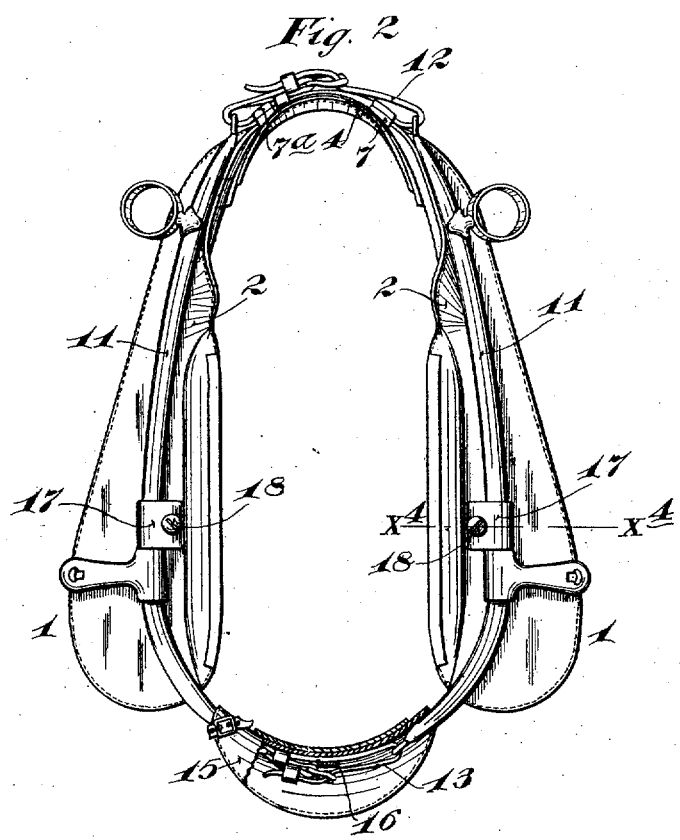

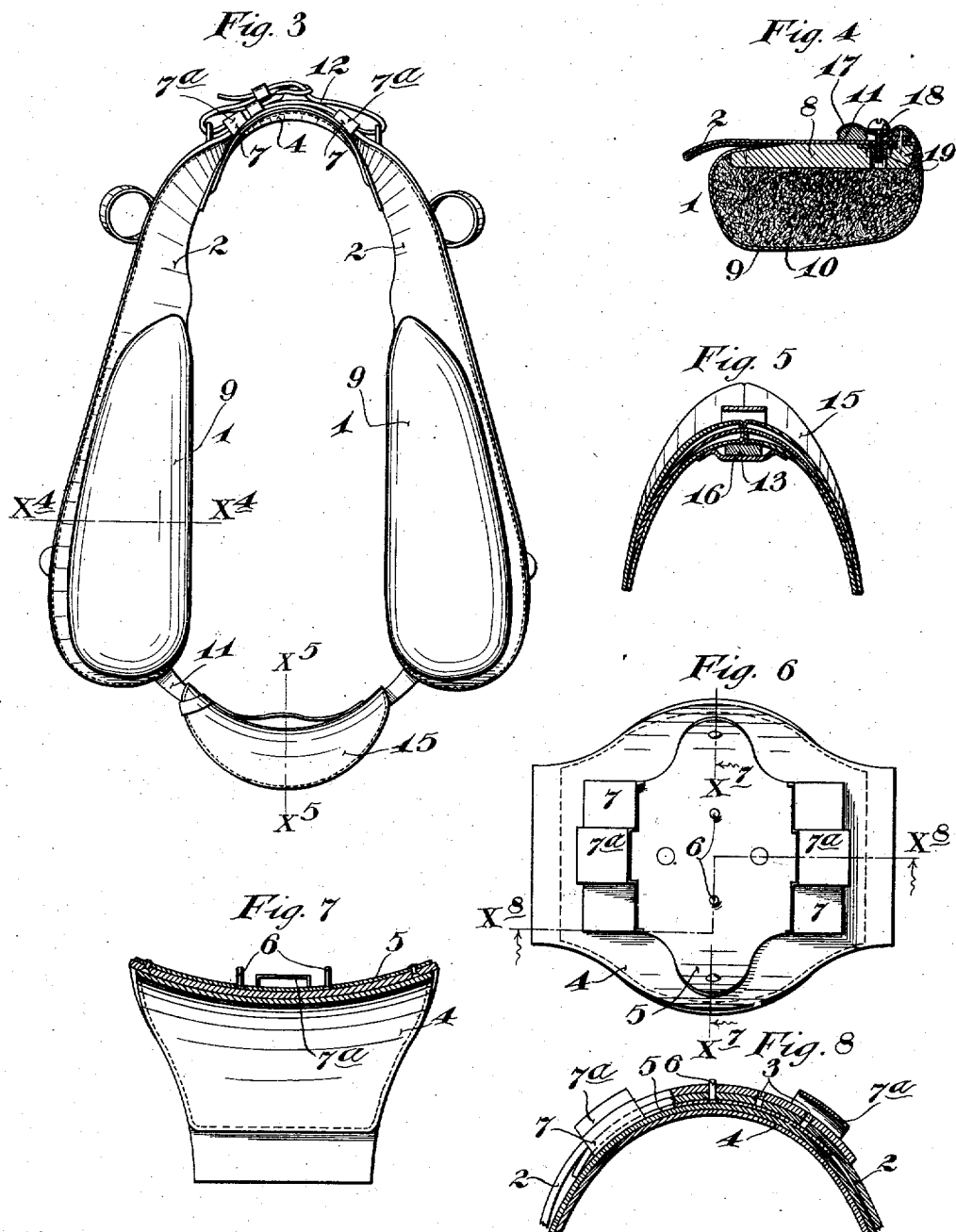

UNITED STATES PATENT OFFICE.

JOHN G. FRIBERG, OF MAIDEN ROCK, WISCONSIN.

UNIVERSALLY-ADJUSTABLE COMBINED HORSE-COLLAR AND HAMES.

987,127.        Specification of Letters Patent.        Patented Mar. 21, 1911.

Application filed August 2, 1909. Serial No. 510,933.

*To all whom it may concern:*

Be it known that I, JOHN G. FRIBERG, a citizen of the United States, residing at Maiden Rock, in the county of Pierce and State of Wisconsin, have invented certain new and useful Improvements in Universally-Adjustable Combined Horse-Collars and Hames; and I do hereby declare the following to be a full, clear, and exact description of the invention, such as will enable others skilled in the art to which it appertains to make and use the same.

My invention has for its object to provide a combined horse collar and hames universally adjustable for adaptation to different sizes of horses, and wherein the body portions or shoulder pads of the collar are carried by a flexible and adjustable neck band rendering the said body portions independently adjustable in respect to each other, for automatic adaptation to the movements of the horse's shoulders.

To the above ends, the invention consists of the novel devices and combination of devices hereinafter described and defined in the claim.

The invention is illustrated in the accompanying drawings, wherein like characters indicate like parts throughout the several views.

Referring to the drawings, Figure 1 is a plan view of the combined horse collar and hames; Fig. 2 is a view of the same in front elevation; Fig. 3 is a view of the same in rear elevation; Fig. 4 is a horizontal section taken on the line $X^4 X^4$ of Figs. 2 and 3; Fig. 5 is a vertical section on an enlarged scale taken on the line $X^5 X^5$ of Fig. 3; Fig. 6 is a plan view, on an enlarged scale, of the neck pad; Fig. 7 is a transverse vertical section taken through the neck pad, on the line $X^7 X^7$ of Fig. 6; and Fig. 8 is a longitudinal vertical section taken through the neck pad on the irregular line $X^8 X^8$ of Fig. 6.

The numeral 1 indicates independent body portions or shoulder pads of the horse collar, each of which is provided with one section of a two-part upwardly extended flexible neck band 2 provided with a series of holes 3 punched therein and arranged in pairs and laterally spaced apart crosswise thereof, the purpose of which will presently appear.

The numeral 4 indicates a neck pad, the tips of which will slightly yield. The neck pad 4 has rigidly secured to its upper surface, by rivets or other suitable means, a thin metallic pad plate 5. To the intermediate portion of the plate 5 is rigidly secured a pair of upwardly projecting studs 6, laterally spaced crosswise thereof. The plate 5 is also provided, on its upper surface, with a pair of raised keepers 7, preferably formed integral therewith and located one on each side of the studs 6. Each keeper 7, at its intermediate portion, is pressed still farther upward to form a keeper $7^a$, which keepers $7^a$ are adapted to receive the upper hame strap and support the neck pad 4 therefrom. The free ends of the flexible neck band 2 are adapted to be passed through the keepers 7 and their ends overlapped and adjustably and detachably secured to the studs 6 and thereby to each other, by means of the studs 6 projecting through any two pairs of alined holes 3 in the overlapped sections of the neck band 2.

The collar body portions or shoulder pads 1 are each constructed of a hame-seating face plate 8 made of wood or other suitable material and a leather pouch 9, which is secured to the face plate 8 and stuffed with a filler of hair 10, or other suitable material, as best shown in Fig. 4. A pair of hames 11 are seated on the face plates 8 and have their opposite ends adjustably and flexibly connected together by the customary upper hame strap 12 and lower hame strap 13. To protect the horse from the wear of the lower hame strap 13 and adjacent ends of the hames 11, a shield 15 is secured to the hame strap 13 by a loop 16 secured to the under side of the shield 15.

Each body portion or shoulder pad 1 is adjustably and detachably secured to the hame member seated thereon by means of an overlying metallic clip 17, which clip, in turn, is, as shown, adjustably and detachably secured to one of the face plates 8 by a set screw 18. The heads of the set screws 18 bear against the upper surface of the clips 17 and their stem portions have screw-threaded engagement with nut blocks 19 countersunk in and rigidly secured to the face plates 8. By tightening the set screws 18, the clips 17 may be made to bear against the outer face of the hames 11 and frictionally hold the body portion or shoulder pads 1 independently and adjustably connected to the hames 11, with respect to each other.

From the above description, it is evident that, by the adjustment of the hame straps 12 and 13, the size of the collar may be varied, at will, to fit different sizes of horses; and, by the adjustment of the flexible neck band 2, with respect to the neck pad 5, the body portions or shoulder pads 1 may be raised or lowered in respect to the hames 11, to properly position the same against the shoulders of the horse; and, after the body portions or shoulder pads 1 have been properly positioned, the same are rigidly secured to the hames 11 by the clips 17, and, thereafter, the fact that the body portions or pads of the collar are free from each other, at their lower ends, and that their upper ends are supported by the flexible neck band 2 and that the hames 11 are flexibly connected, at their opposite ends, will permit the pads to automatically adjust themselves to the movements of the horse's shoulder.

It may be noted that the neck pad and sectional neck band is applicable to any collar.

Actual usage has demonstrated the efficiency of the invention herein disclosed and claimed.

What I claim is:

The combination with a pair of metallic hames and hame straps adjustably and flexibly connecting the upper and lower ends thereof, of shoulder pads independently and adjustably secured one to each of said hames, the said hames and the lower hame strap constituting the only connection between the lower portions of said pads, and the said pads having upwardly extended overlapped flat and flexible neck bands, a neck pad, a metallic pad plate secured to said neck pad and provided with projecting studs adjustably engaging perforations in the overlapped neck bands and provided with keepers through which the overlapped ends of said neck bands are passed, the said keepers having raised portions through which the upper hame strap is also passed, and the said shoulder pads being terminated below the downturned end portions of said neck pad, substantially as described.

In testimony whereof I affix my signature in presence of two witnesses.

JOHN G. FRIBERG.

Witnesses:
H. D. KILGORE,
ALICE V. SWANSON.

---

Copies of this patent may be obtained for five cents each, by addressing the "Commissioner of Patents, Washington, D. C."